US011519519B2

(12) United States Patent
Oikawa et al.

(10) Patent No.: US 11,519,519 B2
(45) Date of Patent: Dec. 6, 2022

(54) CHANNEL SELECTOR VALVE (71) Applicant: Hitachi Astemo, Ltd., Hitachinaka (JP)

(72) Inventors: Naoki Oikawa, Sakura (JP); Yuta Soma, Tochigi-ken (JP); Ken Motohashi, Utsunomiya (JP); Yuji Ito, Utsunomiya (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/827,789

(22) Filed: Mar. 24, 2020

(65) Prior Publication Data
US 2020/0309281 A1 Oct. 1, 2020

(30) Foreign Application Priority Data
Mar. 29, 2019 (JP) .............................. JP2019-066201

(51) Int. Cl.
*F16K 11/07* (2006.01)
*F16K 31/06* (2006.01)

(52) U.S. Cl.
CPC ...... *F16K 31/0613* (2013.01); *F16K 11/0716* (2013.01)

(58) Field of Classification Search
CPC .............. F16K 31/0613; F16K 11/07; F16K 11/0716; Y10T 137/8671; Y10T 137/86702; Y10T 137/86614
See application file for complete search history.

(56) References Cited

U.S. PATENT DOCUMENTS

| 8,176,939 | B2 | 5/2012 | Yoshimura | |
| 2007/0056645 | A1* | 3/2007 | Arnold | F16K 11/0716 137/625.65 |
| 2007/0158606 | A1 | 7/2007 | Oishi | |
| 2009/0020718 | A1* | 1/2009 | Stallmann | F16K 11/0716 251/324 |
| 2011/0309281 | A1* | 12/2011 | Hoppe | F15B 13/0402 251/324 |

(Continued)

FOREIGN PATENT DOCUMENTS

| JP | 2007-182964 | 7/2007 |
| JP | 2010-101341 | 5/2010 |

OTHER PUBLICATIONS

Chinese Office Action dated Apr. 26, 2022, partial English translation included, 7 pages.

*Primary Examiner* — Kelsey E Cary
(74) *Attorney, Agent, or Firm* — Rankin, Hill & Clark LLP (57) ABSTRACT

A sleeve is provided inside a body configuring a channel selector valve, and first and second guide portions with which outer peripheries of first and second land portions of a valve body are in sliding contact are formed on one end side and the other end side of the sleeve. The first and second guide portions are formed to axially overlap with the first and second land portions so as to abut the first and second land portions at all times when the valve body axially moves. The valve body includes a plurality of communicating paths penetrating through the valve body in the axial direction, and, in the sleeve, a first space formed on one end side of the valve body and a second space formed on the other end side of the valve body communicate with each other via the communicating paths.

4 Claims, 2 Drawing Sheets

(56) References Cited

U.S. PATENT DOCUMENTS

| | | | | |
|---|---|---|---|---|
| 2012/0210963 A1* | 8/2012 | Bayrakdar | .............. | F01L 1/344 |
| | | | | 123/90.17 |
| 2012/0325169 A1* | 12/2012 | Draheim | ............... | F01L 1/3442 |
| | | | | 123/90.17 |
| 2015/0000774 A1* | 1/2015 | Sung | ................... | F16K 31/0613 |
| | | | | 137/624.27 |
| 2015/0059893 A1* | 3/2015 | Nishiyama | .............. | F16K 15/18 |
| | | | | 137/596.1 |
| 2015/0226344 A1* | 8/2015 | Miyazoe | ................. | F16K 11/07 |
| | | | | 137/625.48 |
| 2015/0330271 A1* | 11/2015 | Lappan | ................. | F04B 49/002 |
| | | | | 137/625.48 |
| 2018/0156341 A1* | 6/2018 | Arzuaga | ............... | C10B 33/006 |
| 2018/0299025 A1* | 10/2018 | Hilzendegen | ...... | G05D 16/2024 |

\* cited by examiner

CHANNEL SELECTOR VALVE

CROSS-REFERENCE TO RELATED APPLICATION

This application is based upon and claims the benefit of priority from Japanese Patent Application No. 2019-066201 filed on Mar. 29, 2019, the contents of which are incorporated herein by reference.

BACKGROUND OF THE INVENTION

Field of the Invention

The present invention relates to a channel selector valve that changes the circulation state of a channel, through which fluid flows, by displacing a valve body.

Description of the Related Art

A channel selector valve has been known that includes a valve body, which is displaceable in the axial direction, in a tubular body and changes a channel of fluid circulating in the body. As disclosed in, for example, Japanese Laid-Open Patent Publication No. 2007-182964, this channel selector valve includes: a spool valve with a cylindrical sleeve in which a spool, which is a valve body, is provided in a displaceable manner; and a solenoid that is provided at an end of the spool valve and biases the spool in the axial direction.

Moreover, in a connection between the spool valve and the solenoid, a substantially ring-shaped diaphragm made of rubber is provided, the outer edge thereof is sandwiched between the sleeve and a stator of the solenoid, a shaft protruding from an end of the spool is inserted through the center of the diaphragm, and the diaphragm is fitted in a groove formed in the outer periphery of the shaft, whereby the spool valve and the solenoid are isolated from each other.

The spool moves in the axial direction using magnetic force which is generated by the passage of electric current through the solenoid and changes a channel of fluid which is supplied to the inside of the sleeve, and the diaphragm prevents oil, foreign substances, and the like in the sleeve from entering the solenoid.

SUMMARY OF THE INVENTION

In the above-described channel selector valve, a member, such as a diaphragm, for isolating the solenoid and the sleeve from each other is provided to prevent foreign substances and the like from entering the solenoid, which results in an increase in the number of parts and assembly man-hours and leads to an increase in production costs, and, after many years of use, the channel selector valve will suffer a decrease in durability caused by the diaphragm made of rubber.

Moreover, the property of the diaphragm made of rubber whose hardness changes with changes in temperature makes it necessary to set the driving force of the solenoid with consideration given to the changes in hardness when displacing the shaft (the spool valve), in which the diaphragm is fitted, in the axial direction. For example, when the driving force of the solenoid is set in accordance with hardness at low temperatures at which the diaphragm (rubber) exhibits the highest hardness, it is necessary to increase the driving force of the solenoid, and an increase in output requires an increase in performance or results in an increase in running costs such as power consumption.

A general object of the present invention is to provide a channel selector valve that can prevent foreign substances and the like from entering an area other than a channel while reducing the number of parts and assembly man-hours with a simple structure.

According to an aspect of the present invention, a channel selector valve includes: a body including an inlet port to which fluid is supplied, and an outlet port; a valve body provided in the body so as to be movable in an axial direction; and a drive portion configured to bias the valve body in the axial direction, the channel selector valve changing a communicating state between the inlet port and the outlet port by an axial movement of the valve body. A channel configured to make the inlet port and the outlet port communicate with each other is formed inside the body, and the body includes, inside thereof, one space formed at one axial end side of the valve body that is a side where the drive portion is located, and another space formed at another axial end side of the valve body. An outer periphery of the valve body is in sliding contact with an inner periphery of the body at both axial ends thereof such that the outer periphery and the inner periphery overlap in the axial direction at all times, thereby separating the channel provided between the one space and the other space from the one space and the other space, and the valve body includes a communicating path configured to make the one space and the other space communicate with each other.

According to the present invention, the channel that makes the inlet port and the outlet port communicate with each other is formed inside the body that makes up the channel selector valve, and the body includes, inside thereof, the one space formed at the one axial end side of the valve body that is the side where the drive portion is located, and the other space formed at the other axial end side of the valve body. Meanwhile, the valve body is provided in the body so as to be movable in the axial direction, the outer periphery of the valve body is in sliding contact with the inner periphery of the body at both axial ends thereof such that the outer periphery and the inner periphery overlap in the axial direction at all times, thereby separating the one space and the other space from the channel, and the valve body includes the communicating path that makes the one space and the other space communicate with each other.

Therefore, when the valve body moves in the axial direction along the body, it is possible to separate each of the one space and the other space from the channel with a simple structure in which the outer periphery of the valve body is brought into sliding contact with the inner periphery of the body at both axial ends thereof at all times, which eliminates the need to provide an isolating member such as a diaphragm between the body and the drive portion as in the existing channel selector valve and makes it possible to prevent foreign substances and the like contained in the fluid from entering the one space and the other space which are not the channel.

As a result, as compared with the existing channel selector valve that prevents foreign substances and the like from entering a solenoid by providing a diaphragm, it is possible to reduce the number of parts and assembly man-hours by eliminating the need for a member for isolation such as a diaphragm and thereby reduce production costs. Moreover, there is no need to use a diaphragm made of rubber, which makes it possible to increase durability as compared with the existing channel selector valve and also eliminates the need to set the output of the drive portion in accordance with changes in hardness.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
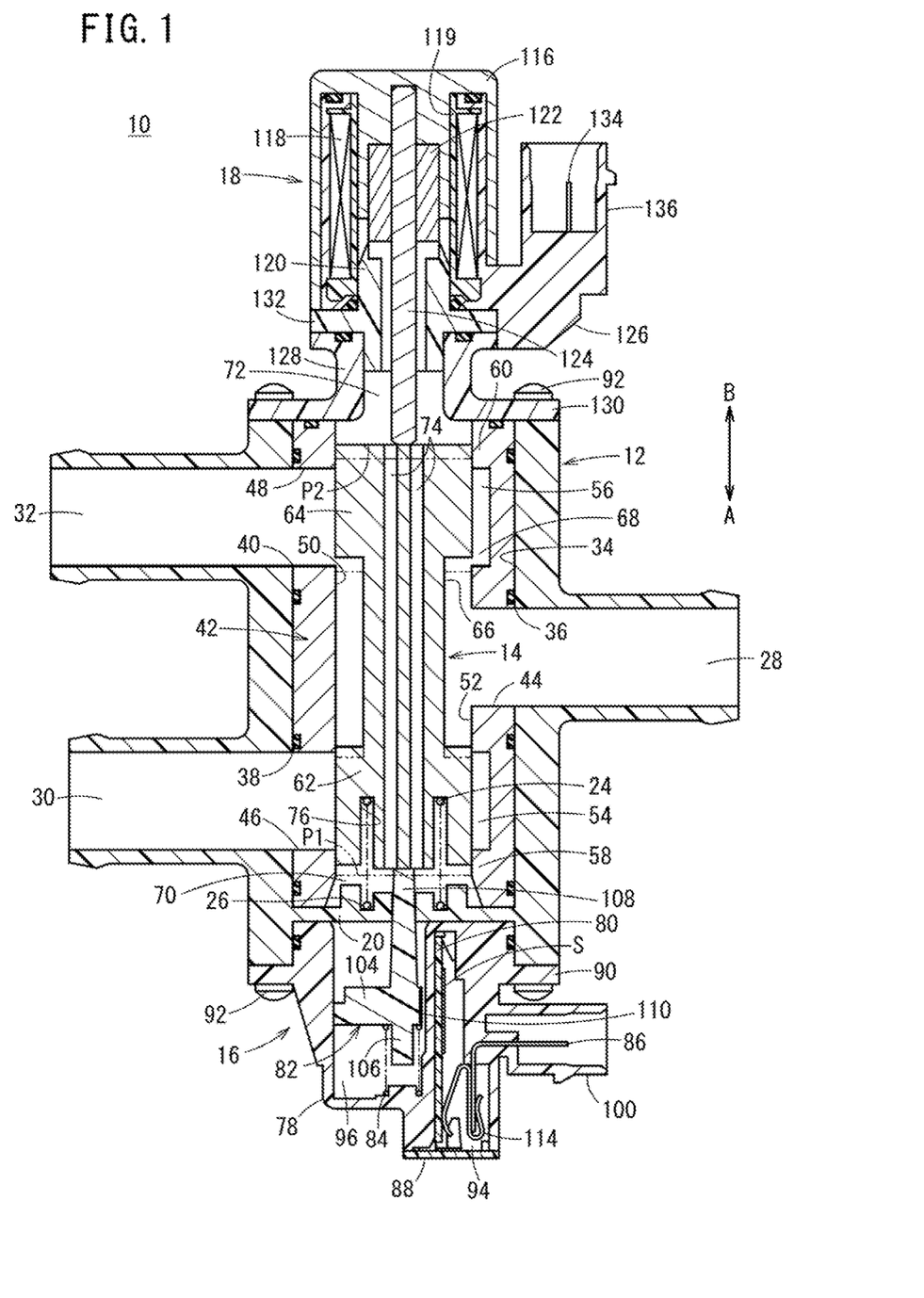
FIG. 1 is an overall sectional view of a channel selector valve according to an embodiment of the present invention.
Figure 2A:
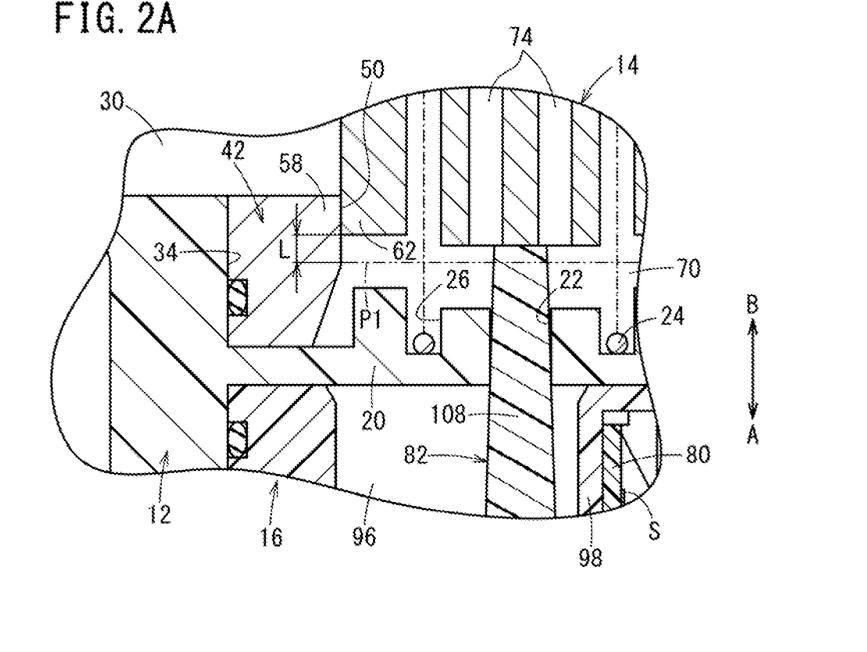
FIG. 2A is an enlarged sectional view of an area near a first guide portion in the channel selector valve shown in FIG. 1.
Figure 2B:
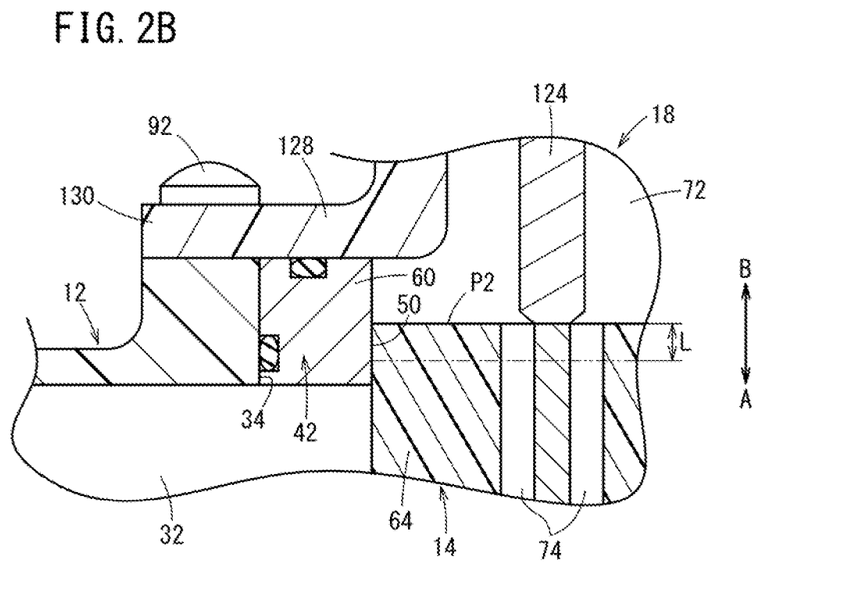
FIG. 2B is an enlarged sectional view of an area near a second guide portion in the channel selector valve shown in FIG. 1.

As shown in FIGS. 1 to 2B, a channel selector valve 10 includes a body 12, a valve body 14 that is provided so as to be movable in the axial direction (an arrow A-B direction) of the body 12, a sensor unit (a detecting member) 16 connected to one end of the body 12, and a drive portion 18 connected to the other end of the body 12.

The body 12 is made of, for example, a resin material in the shape of a cylinder which is long in the axial direction (the arrow A-B direction), and the outer periphery thereof is formed so as to have the same diameter in the axial direction. A locking wall 20 is formed in the body 12 on the side (an arrow A direction) thereof where one axial end is located and an opening is formed on the side (an arrow B direction) thereof where the other axial end is located. In the center of the locking wall 20, a rod hole 22 (see FIG. 2A) into which a detection body 82 of a sensor unit 16, which will be described later, is inserted is formed so as to penetrate through the locking wall 20 in the axial direction, and, on the radial outer side of the rod hole 22, a first annular groove 26 in which one end of a valve spring 24 is held is formed.

Moreover, in the outer periphery of the body 12, a tube-shaped inlet port 28 and first and second outlet ports 30 and 32, which protrude radially outward, are formed, and the inlet port 28 protrudes toward one side in the radial direction in almost the middle in the axial direction. The first and second outlet ports 30 and 32 protrude toward the other side in the radial direction, which is the direction opposite to the direction in which the inlet port 28 protrudes, and are formed so as to be separated from each other with a predetermined distance put therebetween in the axial direction so that the first outlet port 30 is located on the side (the arrow A direction) of the body 12 where one end thereof is located and the second outlet port 32 is located on the side (the arrow B direction) of the body 12 where the other end thereof is located.

Unillustrated pipes are connected to the inlet port 28 and the first and second outlet ports 30 and 32; for example, fluid is supplied to the inlet port 28 through the pipe from an unillustrated supply source and unillustrated apparatuses, to which the fluid is supplied, are connected to the first and second outlet ports 30 and 32.

Meanwhile, a first housing hole 34 which has a substantially uniform diameter and extends in the axial direction is formed in the body 12. The first housing hole 34 communicates with the inlet port 28, the first outlet port 30, and the second outlet port 32 via first to third openings 36, 38, and 40, respectively, and a sleeve 42 formed in a cylindrical shape is housed in the first housing hole 34.

The sleeve 42 is made of, for example, a metal material such as an aluminum alloy in the shape of a cylinder and formed in the axial direction (the arrow A-B direction) so as to have the same external diameter corresponding to the first housing hole 34 of the body 12, and, in positions facing the first to third openings 36, 38, and 40 of the body 12, first to third communicating holes 44, 46, and 48 are respectively formed. The first to third communicating holes 44, 46, and 48 respectively communicate with the inlet port 28 and the first and second outlet ports 30 and 32 via the first to third openings 36, 38, and 40 by penetrating through the sleeve 42 in the radial direction thereof.

Moreover, a second housing hole 50 which extends in the axial direction (the arrow A-B direction) and has openings at both axial ends is formed in the sleeve 42, and the second housing hole 50 includes a seating portion 52 which is formed in the middle in the axial direction and in which the first communicating hole 44 is formed, a first large-diameter portion 54 formed on the side (the arrow A direction) of the seating portion 52 where one end thereof is located, and a second large-diameter portion 56 formed on the side (the arrow B direction) of the seating portion 52 where the other end thereof is located.

Furthermore, in the second housing hole 50, a first guide portion 58 with which the valve body 14 is in sliding contact is formed below (the arrow A direction) the first large-diameter portion 54 and a second guide portion 60 with which the valve body 14 is in sliding contact is formed above (the arrow B direction) the second large-diameter portion 56.

The seating portion 52 is formed so as to have a substantially uniform diameter and a predetermined length in the axial direction (the arrow A-B direction), the first communicating hole 44 is formed in the middle thereof in the axial direction, and first and second land portions 62 and 64 of the valve body 14, which will be described later, are formed in such a way that the first and second land portions 62 and 64 can be in sliding contact with the seating portion 52.

The first large-diameter portion 54 is provided on the side (the arrow A direction) of the seating portion 52 where the sensor unit 16 is located, has a predetermined length in the axial direction, and is formed so as to have a larger diameter than the seating portion 52.

The second large-diameter portion 56 is provided on the side (the arrow B direction) of the seating portion 52 where the drive portion 18 is located, has a predetermined length in the axial direction, and is formed so as to have a larger diameter than the seating portion 52 and have the same internal diameter as the first large-diameter portion 54.

The first and second guide portions 58 and 60 are formed so as to have the same internal diameter as the seating portion 52 at one end and the other end of the sleeve 42 and formed in such a way that the first and second land portions 62 and 64 of the valve body 14, which will be described later, can be in sliding contact with the first and second guide portions 58 and 60, respectively.

That is, the second housing hole 50 is formed as a stepped hole so that the seating portion 52 formed in the middle in the axial direction and the first and second guide portions 58 and 60 respectively formed at one end and the other end of the second housing hole 50 have a small diameter and the first and second large-diameter portions 54 and 56 respectively formed on the side of the second housing hole 50 where the one end is located and on the side thereof where the other end is located have a large diameter.

The sleeve 42 is inserted into the first housing hole 34 of the body 12 in the axial direction, the one end of the sleeve 42 abuts the locking wall 20, whereby positioning of the sleeve 42 on the side (the arrow A direction) thereof where the sensor unit 16 is located is performed, and the other end of the sleeve 42 is placed so as to be substantially flush with the other end of the body 12. A plurality of O rings are provided on the outer periphery of the sleeve 42 and prevent a leak of the fluid from between the sleeve 42 and the body 12.

The valve body 14 is made up of a spool-shaped shaft body made of, for example, a metal material so as to be circular in cross section and is provided so as to be movable in the vertical direction (the arrow A-B direction) in the sleeve 42 in the axial direction.

Specifically, the valve body 14 is formed so that the valve body 14 can move by a predetermined stroke amount L (see FIGS. 2A and 2B) in the axial direction (the arrow A-B direction) between a lower end position P1 (see FIG. 1) to which the valve body 14 is moved by being pressed downward (the arrow A direction) against the elastic force of the valve spring 24 when the drive portion 18 is driven and an upper end position P2 (see FIG. 1) to which the valve body 14 is moved upward (the arrow B direction) by the elastic force of the valve spring 24 as a result of a decrease in the driving force of the drive portion 18.

The valve body 14 includes the first land portion 62 formed on the outer periphery on the side (the arrow A direction) of the valve body 14 where one axial end thereof is located, the second land portion 64 formed on the outer periphery on the side (the arrow B direction) of the valve body 14 where the other axial end thereof is located, and a communicating recess portion 66 that is provided on the outer periphery side between the first land portion 62 and the second land portion 64.

The first and second land portions 62 and 64 are formed so as to have the same diameter and formed so as to have substantially the same axial length. Moreover, the valve body 14 is provided so as to be displaceable in the axial direction (the arrow A-B direction) with the first land portion 62 in sliding contact with at least one of the seating portion 52 and the first guide portion 58 of the sleeve 42 and the second land portion 64 in sliding contact with at least one of the seating portion 52 and the second guide portion 60 of the sleeve 42. In this case, a space which is formed between the second housing hole 50 of the sleeve 42 and the outer periphery of the valve body 14 and communicates with the first communicating hole 44 is a channel 68 (see FIG. 1) through which the fluid flows.

The valve body 14 is provided so that, irrespective of the movement position of the valve body 14, the first land portion 62 is in sliding contact with the first guide portion 58 in such a way that the first land portion 62 overlaps with the first guide portion 58 in the axial direction (the arrow A-B direction) at all times (see FIG. 2A) and the second land portion 64 is in sliding contact with the second guide portion 60 in such a way that the second land portion 64 overlaps with the second guide portion 60 in the axial direction (the arrow A-B direction) at all times (see FIG. 2B).

As a result, in the sleeve 42, a first space (the other space) 70 formed on the side (the arrow A direction) of the valve body 14 where one end thereof is located and the first large-diameter portion 54 into which the fluid flows are separated by the first land portion 62 at all times and a second space (one space) 72 formed on the side (the arrow B direction) of the valve body 14 where the other end thereof is located and the second large-diameter portion 56 into which the fluid flows are separated by the second land portion 64 at all times.

The first space 70 communicates with the first large-diameter portion 54 via small clearance provided between the first land portion 62 of the valve body 14 and the first guide portion 58, and the second space 72 communicates with the second large-diameter portion 56 via small clearance provided between the second land portion 64 of the valve body 14 and the second guide portion 60.

Moreover, the communicating recess portion 66 is annularly formed so as to be recessed radially inward relative to the first and second land portions 62 and 64, placed so as to face the seating portion 52 and the first communicating hole 44 in the sleeve 42, and formed so as to be longer than the axial length of the seating portion 52.

Meanwhile, in the valve body 14, a plurality of communicating paths 74 penetrating through the valve body 14 in the axial direction (the arrow A-B direction) from the one end to the other end thereof are formed, and the communicating paths 74 are formed in positions on the radial outer side of the axial center of the valve body 14 in such a way that the communicating paths 74 are separated from each other at equal intervals in the circumferential direction with respect to the axial center. The first space 70 on the side of the valve body 14 where the one end thereof is located and the second space 72 on the side of the valve body 14 where the other end thereof is located communicate with each other in the sleeve 42 at all times via the communicating paths 74, and the pressure inside the first space 70 is the same as the pressure inside the second space 72.

Moreover, at the one end of the valve body 14, a second annular groove 76 recessed in the axial direction toward the side (the arrow B direction) of the valve body 14 where the other end thereof is located is formed, and the second annular groove 76 is formed so as to be on the outer periphery side of the communicating paths 74 and face the first annular groove 26 of the locking wall 20. The valve spring 24 made up of a coil spring is placed between the second annular groove 76 and the first annular groove 26, and the valve spring 24 has an elastic force that biases the valve body 14 toward the drive portion 18 (the arrow B direction) at all times.

The sensor unit 16 functions as a position detecting device that can detect the axial (the arrow A-B direction) position of the valve body 14 and includes, for example, a sensor case 78, a substrate 80 that is housed in the sensor case 78, the detection body 82 that is provided so as to be movable along the substrate 80, a sensor spring 84 that biases the detection body 82 toward the valve body 14 (the arrow B direction), terminals 86 that are electrically connected to the substrate 80, and a lid member 88 that closes an opening of the sensor case 78.

The sensor case 78 is formed as a hollow body made of, for example, a resin material, the other end of the sensor case 78 where an opening is formed is inserted into the side (the arrow A direction) of the body 12 where the one end thereof is located, and a first flange portion 90 protruding outward in the width direction is secured with screws 92, with the first flange portion 90 abutting the one end of the body 12. As a result, the one end of the body 12 where an opening is formed is closed with the sensor unit 16.

Moreover, the sensor case 78 has inside a substrate housing chamber 94 in which the substrate 80 is housed and a detection body housing chamber 96 in which the detection body 82 is housed, and the substrate housing chamber 94 and the detection body housing chamber 96 are separated from each other by a partition 98 provided therebetween.

On the other hand, the sensor case 78 has outside a first coupler portion 100 protruding so as to be perpendicular to the axial direction, the tips of the terminals 86 are exposed in the first coupler portion 100, and, by connecting an unillustrated connector to the first coupler portion 100, a control signal from a controller (which is not shown in the drawing) is input to the terminals 86 and a detection signal detected by the sensor unit 16 is output to the controller.

The substrate 80 is inserted into the substrate housing chamber 94 along the partition 98 from the side (the arrow A direction) of the substrate housing chamber 94 where one end thereof is located and an opening is formed, whereby the substrate 80 is housed in the substrate housing chamber 94. The substrate housing chamber 94 is closed by the lid member 88 being attached to the opening thereof in a state in which the substrate 80 is housed in the substrate housing chamber 94.

The substrate 80 is formed in a plate-like shape, for instance, and is electrically connected when the three terminals 86, which make up the first coupler portion 100, make contact with an unillustrated electrode portion. Moreover, a sensor coil (a sensor) S for sensing the approach of the detection body 82, which is placed close to the substrate 80, is provided on the substrate 80 and produces a magnetic field based on a control signal from the terminals 86 which will be described later.

The detection body housing chamber 96 is formed so as to be adjacent to the substrate housing chamber 94 with the partition 98 placed therebetween, and the detection body 82 is provided in the detection body housing chamber 96 so as to be movable in the axial direction (the arrow A-B direction). The detection body 82 includes, for example, a main body portion 104 formed in a block-like shape, first and second rod portions 106 and 108 protruding from the main body portion 104 in the axial direction, and a detection piece 110 that is attached on a side face of the main body portion 104.

One side face of the main body portion 104, which is perpendicular to the direction in which the detection body 82 moves, abuts the inner wall surface of the detection body housing chamber 96, which allows the main body portion 104 to be guided so as to be displaceable in the axial direction (the arrow A-B direction). Moreover, the other side face of the main body portion 104 is provided so as to face the partition 98 and the detection piece 110 is attached on the other side face.

The first rod portion 106 protrudes from one axial end face of the main body portion 104 in the axial direction (the arrow A direction), and the sensor spring 84, which is made up of a coil spring, is placed on the outer periphery side of the first rod portion 106. One end of the sensor spring 84 abuts the axial end face of the main body portion 104 and the other end engages a spring seat of the detection body housing chamber 96 with the first rod portion 106 placed in the sensor spring 84, whereby the sensor spring 84 biases the detection body 82 toward the valve body 14 (the arrow B direction) at all times by the elastic force of the sensor spring 84.

The second rod portion 108 is formed in line with the first rod portion 106 with the main body portion 104 placed therebetween, protrudes from an axial end face of the main body portion 104 in the axial direction (the arrow B direction) by a predetermined length, and is inserted into the rod hole 22 of the locking wall 20 in the body 12, and the tip of the portion abuts the center of the one end of the valve body 14. In this case, since the detection body 82 is biased toward the valve body 14 (the arrow B direction) at all times by the elastic force of the sensor spring 84, the tip of the second rod portion 108 abuts the one end of the valve body 14 at all times.

The detection piece 110 is a plate made of a metal material, for example, attached so as to be substantially parallel to the other side face of the main body portion 104 and substantially parallel to the partition 98, and provided so as to be movable in the axial direction (the arrow A-B direction) along the partition 98 with the detection body 82. Overcurrent flows through the detection piece 110 when the detection piece 110 gets close to the magnetic field around the sensor coil S of the substrate 80 with the partition 98 placed therebetween, which causes a change in inductance (capacitance), and this inductance change is detected and output to the unillustrated controller from the terminals 86 as a detection signal.

The terminals 86 include, for example, three terminals: a pair of power supply terminals, which are L-shaped in cross section, and a signal terminal provided between the power supply terminals. The terminals 86 are placed so as to be evenly spaced in the width direction and are formed in the sensor case 78 with the tips of the terminals 86 exposed in the first coupler portion 100 and the base ends on the side of the terminals 86 opposite to the tips exposed in the substrate housing chamber 94.

Moreover, a joint member 114 is electrically connected to the base ends of the terminals 86, and the terminals 86 and the electrode portion of the substrate 80 are electrically connected via the joint member 114. A control signal from the unillustrated controller is supplied to the substrate 80 via the terminals 86, and the position of the detection body 82 detected by the substrate 80 is output to the controller from the terminals 86 as a detection signal.

As shown in FIG. 1, the drive portion 18 is, for example, a solenoid that obtains axial thrust by generating magnetic force by the passage of electric current through a coil 118. The drive portion 18 includes a casing 116, a bobbin 119 which is housed in the casing 116 and around which the coil 118 is wound, a fixed core 120 which is provided on the lower side of the bobbin 119, a plunger (a movable body) 122 which is provided inside the bobbin 119 and biased toward the fixed core 120 by the excitation of the coil 118, a shaft 124 which is connected to the center of the plunger 122, and a resin molded portion 126 which covers the outer periphery sides of the bobbin 119 and the coil 118.

The casing 116 is formed in the shape of a closed-end cylinder and one end of the casing 116, where an opening is formed, is closed with a fixing member 128 integrally swaged thereon. A second flange portion 130 formed at one end of the fixing member 128 is connected to the other end of the body 12 with a plurality of screws 92 with the second flange portion 130 abutting the other end of the body 12.

The bobbin 119 is formed in the shape of a cylinder whose diameter is increased radially outward at one end and the other end thereof, and the coil 118 is wound around the outer periphery of the bobbin 119. In the casing 116, the resin molded portion 126, which will be described later, forms the outer periphery sides of the coil 118 and the bobbin 119.

The fixed core 120 is made of a metal material in a substantially cylindrical shape, and a part of the fixed core 120 is inserted into the bobbin 119 and a flange portion 132 extending radially outward from the outer periphery of the fixed core 120 is sandwiched between the resin molded portion 126 and the other end of the fixing member 128.

The plunger 122 is made of, for example, a magnetic material in the shape of a cylinder, placed on the inner periphery side of the bobbin 119, and provided so as to face the other end of the fixed core 120.

Moreover, the shaft 124 is connected to the axial center of the plunger 122, the shaft 124 protrudes from one end of the plunger 122 toward the valve body 14 (the arrow A direction) by a predetermined length, and a part of the shaft 124 is inserted into the fixed core 120 and one end thereof abuts the center of the other end of the valve body 14. In this case, since the valve body 14 is biased toward the shaft 124 (the arrow B direction) at all times by the elastic force of the valve spring 24, the one end of the shaft 124 abuts the valve body 14 at all times.

The resin molded portion 126 is made of, for example, a resin material, formed so as to cover the outer periphery sides of the coil 118 and the bobbin 119 in the casing 116, and includes a second coupler portion 136 which protrudes from the side of the resin molded portion 126 and in which a connecting terminal 134 is housed. The connecting terminal 134 is electrically connected to the coil 118 and an unillustrated connector is connected to the second coupler portion 136, whereby a control signal from an unillustrated controller is input to the coil 118 from the connecting terminal 134.

A method of detecting the detection body 82 in the sensor unit 16 is not limited to an inductive sensor that can detect the position based on a change in an induced current which is generated when the detection piece 110 gets close to the magnetic field; for example, a noncontact sensor using a Hall element or the like or a contact sensor may be used.

The channel selector valve 10 according to the embodiment of the present invention is basically constructed as described above; next, the operation and the workings and effects thereof will be described. As shown in FIG. 1, the description is given on the assumption that a state in which the valve body 14 has moved toward the drive portion 18 (the arrow B direction) by the elastic force of the valve spring 24 is an initial position and deals with a case where the channel selector valve 10 is used in a coolant channel through which a coolant circulates as fluid.

In the initial position shown in FIG. 1, the communicating recess portion 66 of the valve body 14 faces the inlet port 28, the first land portion 62 abuts the seating portion 52 and the first guide portion 58, the second land portion 64 abuts only the second guide portion 60, and the second large-diameter portion 56 and the communicating recess portion 66 communicate with each other.

A coolant which is supplied to the inlet port 28 from an unillustrated supply source flows into the sleeve 42 through the first opening 36 and the first communicating hole 44 and then flows into the second large-diameter portion 56 through the channel 68 including a gap between the second large-diameter portion 56 and the communicating recess portion 66 of the valve body 14.

In this case, since the second land portion 64 is in sliding contact with the second guide portion 60 in such a way that a portion of a predetermined length overlaps with the second guide portion 60 in the axial direction (see FIG. 2B), when the coolant flows toward the second space 72 (the arrow B direction) from the second large-diameter portion 56 through clearance, foreign substances and the like contained in the coolant are prevented from entering the second space 72 and prevented from entering the drive portion 18 (the arrow B direction) from the second space 72.

Meanwhile, since the first land portion 62 of the valve body 14 abuts the seating portion 52, the first large-diameter portion 54 does not communicate with the communicating recess portion 66, and the coolant does not flow into the first large-diameter portion 54.

The coolant flowing into the second large-diameter portion 56 is guided to an unillustrated apparatus, which needs cooling, from the second outlet port 32 through the third communicating hole 48 and the third opening 40 which face the second large-diameter portion 56.

Moreover, in the sensor unit 16, the detection body 82 abutting the valve body 14 in the above-described initial position moves upward with the valve body 14 by the elasticity of the sensor spring 84, electric current is passed through the substrate 80 from the unillustrated controller via the terminals 86 of the first coupler portion 100, and an inductance change in accordance with the distance between the magnetic field, which is produced in the sensor coil S, and the detection piece 110 which gets close to the magnetic field is detected.

A detection signal based on this inductance change is output to the unillustrated controller through the terminals 86 from the substrate 80, whereby the axial positions of the detection body 82 with the detection piece 110 and the valve body 14 which the detection body 82 abuts are detected and it is confirmed that the channel selector valve 10 is in the initial position in which the valve body 14 has moved upward in the body 12 and the sleeve 42 and the inlet port 28 and the second outlet port 32 communicate with each other.

Next, to make the coolant which is supplied to the inlet port 28 flow toward the first outlet port 30, a control signal from the unillustrated controller is input to the second coupler portion 136 of the drive portion 18 via wiring, whereby the coil 118 is energized and excited and magnetic flux is produced.

This magnetic flux flows through the fixed core 120, the coil 118, the casing 116, and the plunger 122 and the generated magnetic force causes the plunger 122 to be attracted toward the fixed core 120 (the arrow A direction) with the shaft 124, whereby the valve body 14 which the one end of the shaft 124 abuts is pressed and moves toward the sensor unit 16 (the arrow A direction) against the elastic force of the valve spring 24.

As a result, the communicating recess portion 66 of the valve body 14 faces the inlet port 28, the first land portion 62 is separated from the seating portion 52 and abuts only the first guide portion 58, the communicating recess portion 66 and the first large-diameter portion 54 communicate with each other, the second land portion 64 abuts the seating portion 52 and the second guide portion 60, and the state in which the communicating recess portion 66 and the second large-diameter portion 56 communicate with each other is interrupted.

The coolant supplied to the inlet port 28 flows into the sleeve 42 through the first opening 36 and the first communicating hole 44 and then flows into the first large-diameter portion 54 through the channel 68 including a gap between the first large-diameter portion 54 and the communicating recess portion 66 of the valve body 14.

In this case, since the first land portion 62 is in sliding contact with the first guide portion 58 in such a way that a portion of a predetermined length overlaps with the first guide portion 58 in the axial direction (see FIG. 2A), when the coolant flows toward the first space 70 (the arrow A direction) from the first large-diameter portion 54 through clearance, the foreign substances and the like contained in the coolant are prevented from entering the first space 70. This prevents the foreign substances and the like in the coolant from entering the sensor unit 16 (the arrow A direction) through the first space 70, which makes it possible to improve the reliability and detection accuracy of the sensor unit 16.

Moreover, it is also possible to avoid contact of the foreign substances and the like with the valve spring 24 provided in the first space 70, which makes it possible to move the valve body 14 toward the drive portion 18 (the arrow B direction) reliably and smoothly by the elastic force of the valve spring 24. On the other hand, since the state in which the second large-diameter portion 56 communicates with the communicating recess portion 66 is interrupted, the coolant does not flow into the second large-diameter portion 56.

The coolant flowing into the first large-diameter portion 54 is guided to another unillustrated apparatus, which needs cooling, from the first outlet port 30 through the second communicating hole 46 and the second opening 38 which face the first large-diameter portion 54.

Moreover, in the sensor unit 16, with the downward movement of the valve body 14, the detection body 82 is pushed downward against the elastic force of the sensor spring 84 and moves toward the side (the arrow A direction) thereof where one end is located, the inductance changes as a result of a change in the distance between the magnetic field, which is produced in the sensor coil S of the substrate 80, and the detection piece 110 which gets close to the magnetic field, and a detection signal based on this inductance change is output to the unillustrated controller through the terminals 86.

As a result, the axial positions of the detection body 82 with the detection piece 110 and the valve body 14 which the detection body 82 abuts are detected, and it is confirmed that the valve body 14 has moved downward in the body 12 and the sleeve 42 and the inlet port 28 and the first outlet port 30 communicate with each other.

Moreover, even when the first and second land portions 62 and 64 of the valve body 14 are respectively brought into sliding contact with the first and second guide portions 58 and 60 of the sleeve 42 at all times, the separated first space 70 and second space 72 communicate with each other via the communicating paths 74 of the valve body 14. Thus, when the valve body 14 moves in the sleeve 42 in the axial direction, the coolant in the first and second spaces 70 and 72 is not compressed and does not act as resistance to movement, which makes it possible to displace the valve body 14 smoothly.

As just described, in the above-described channel selector valve 10, by moving the valve body 14 in the vertical direction along the body 12 and the sleeve 42 and changing the communicating state between the inlet port 28 and the first and second outlet ports 30 and 32 via the communicating recess portion 66 of the valve body 14, it is possible to change a coolant supply path.

As described above, in the present embodiment, the cylindrical sleeve 42 is provided in the body 12 that makes up the channel selector valve 10, the valve body 14 is provided so as to be movable in the axial direction along the second housing hole 50 of the sleeve 42, the first land portion 62 formed on the outer periphery of the valve body 14 at one end thereof is in sliding contact with the first guide portion 58 of the sleeve 42, the second land portion 64 formed on the outer periphery of the valve body 14 at the other end thereof is in sliding contact with the second guide portion 60 of the sleeve 42, and the first and second land portions 62 and 64 are made to overlap with the first and second guide portions 58 and 60, respectively, in the axial direction so that the first and second land portions 62 and 64 are in sliding contact with the first and second guide portions 58 and 60, respectively, at all times when the valve body 14 moves in the axial direction.

Therefore, in either of two cases, namely, a case where the valve body 14 moves downward along the sleeve 42 by the driving force from the drive portion 18 and a case where the driving force is decreased and the valve body 14 moves upward along the sleeve 42 by the elastic force of the valve spring 24, the first and second land portions 62 and 64 of the valve body 14 are in sliding contact with the first and second guide portions 58 and 60, respectively, of the sleeve 42, which makes it possible to separate, from the channel 68, the first space 70 formed on the side of the valve body 14 where the one end thereof is located and the second space 72 formed on the side of the valve body 14 where the other end thereof is located.

Thus, it is possible to prevent foreign substances and the like contained in the fluid from entering the first and second spaces 70 and 72 with a simple structure in which the outer periphery of the valve body 14 and the inner periphery of the sleeve 42 are brought into sliding contact with each other at all times without providing a diaphragm (an isolating member) between the body 12 and the sleeve 42 and the drive portion 18 and between the body 12 and the sleeve 42 and the sensor unit 16 as in the existing channel selector valve.

As a result, as compared with the existing channel selector valve that prevents entry of the foreign substances and the like by providing a diaphragm, it is possible to reduce the number of parts and assembly man-hours and thereby reduce production costs.

Moreover, there is no need to use a diaphragm made of rubber whose hardness changes with temperature, which eliminates the need to set the driving force of the drive portion 18 in accordance with changes in hardness. By driving the drive portion 18 by an optimum driving force, it is possible to reduce running costs such as power consumption and increase durability as compared with the existing channel selector valve.

Furthermore, the above-described structure prevents entry of the foreign substances and the like into the sensor unit 16 provided on the side of the channel selector valve 10 where the first space 70 is located, which makes it possible to improve the detection accuracy and reliability of the movement position of the valve body 14 which is detected by the sensor unit 16; in addition, the above-described structure prevents the foreign substances and the like from entering the drive portion 18, which is provided on the side of the channel selector valve 10 where the second space 72 is located, which makes it possible to improve the reliability of the drive portion 18.

Moreover, the above-described drive portion 18 is not limited to a structure using a solenoid that obtains axial thrust by generating magnetic force by the passage of electric current through the coil 118; for example, a step motor or the like that rotates by the passage of electric current therethrough may be used.

Furthermore, while the above description deals with a case where a coolant is used as fluid and the above-described channel selector valve 10 is used to change the supply destination thereof, the application of the channel selector valve 10 is not limited thereto; for example, the channel selector valve 10 may be used to circulate oil, a refrigerant, or the like as fluid and change the supply destination thereof.

It goes without saying that the channel selector valve according to the present invention is not limited to the above-described embodiment and can adopt various structures without departing from the scope of the present invention.

What is claimed is:

1. A channel selector valve comprising:
a body including an inlet port to which fluid is supplied, and an outlet port;
a valve body provided in the body so as to be movable in an axial direction;
a drive portion configured to bias the valve body in the axial direction; and
a detecting member configured to detect an axial position of the valve body,
the channel selector valve changing a communicating state between the inlet port and the outlet port by an axial movement of the valve body, wherein
a channel configured to make the inlet port and the outlet port communicate with each other is formed inside the body, and the body includes, inside thereof, a first enclosed space formed at a first axial end side of the valve body that is a side where the drive portion is located, and a second enclosed space formed at a second axial end side of the valve body where the detecting member is located,
the first enclosed space being enclosed by the body, a first axial end surface of the valve body at the first axial end side, and the drive portion,
the second enclosed space being enclosed by the body, a second axial end surface of the valve body at the second axial end side, and the detecting member,
a shaft of the drive portion abuts the first axial end surface at an axial center of the first axial end surface of the valve body, and a rod portion of the detection body abuts the second axial end surface at an axial center of the second axial end surface of the valve body, and
an outer periphery of the valve body is in sliding contact with an inner periphery of the body at both axial ends thereof such that the outer periphery and the inner periphery overlap in the axial direction at all times, thereby separating the channel provided between the first enclosed space and the second enclosed space from the first enclosed space and the second enclosed space, and the valve body includes a plurality of communicating paths,
at the first axial end surface of the valve body, the plurality of communicating paths are open and in communication with the first enclosed space at positions on a radial outer side of a portion of the first axial end surface of the valve body abutted against the shaft, and
at the second axial end surface of the valve body, the plurality of communicating paths are open and in communication with the second enclosed space at positions on a radial outer side of a portion of the second axial end surface of the valve body abutted against the rod portion.

2. The channel selector valve according to claim 1, wherein
the drive portion is a solenoid configured to displace a movable body in the axial direction by exciting a coil by passage of electric current therethrough.

3. A channel selector valve comprising:
a body including an inlet port to which fluid is supplied, and an outlet port;
a valve body provided in the body so as to be movable in an axial direction;
a drive portion configured to bias the valve body in the axial direction; and
a detecting member configured to detect an axial position of the valve body,
the channel selector valve changing a communicating state between the inlet port and the outlet port by an axial movement of the valve body, wherein
a channel configured to make the inlet port and the outlet port communicate with each other is formed inside the body, and the body includes, inside thereof, a first space formed at a first axial end side of the valve body that is a side where the drive portion is located, and a second space formed at a second axial end side of the valve body opposite to the first axial end side of the valve body,
an outer periphery of the valve body is in sliding contact with an inner periphery of the body at both axial ends thereof such that the outer periphery and the inner periphery overlap in the axial direction at all times, thereby separating the channel provided between the first space and the second space from the first space and the second space,
the valve body includes a communicating path configured to make the first space and the second space communicate with each other,
the valve body includes a first axial end surface on the first axial end side, a second axial end surface on the second axial end side, and the outer periphery between the first axial end surface and the second axial end surface,
the communicating path includes a first opening defined in the first axial end surface of the valve body facing into the first space and a second opening defined in the second axial end surface of the valve body facing into the second space, the first opening and the second opening are closed at the outer periphery and out of communication with the channel, and the communicating path is closed at the outer periphery of the valve body and is out of communication with the channel, the inlet port, and the outlet port,
the first axial end surface of the valve body abuts a shaft of the driving portion at an axial center of the valve body,
the second axial end surface of the valve body abuts a rod portion of the detecting member at the axial center of the valve body,
at the first axial end surface of the valve body, the first opening is open at a position on a radial outer side of the axial center of the valve body, and
at the second axial end surface of the valve body, the second opening is open at a position on the radial outer side of the axial center of the valve body.

4. The channel selector valve according to claim 3, wherein
the drive portion is a solenoid configured to displace a movable body in the axial direction by exciting a coil by passage of electric current therethrough.

* * * * *